United States Patent [19]
Yamato et al.

[11] Patent Number: 5,285,365
[45] Date of Patent: Feb. 8, 1994

[54] POWER CONVERSION SYSTEM, METHOD FOR CONTROLLING THE SAME, AND UNINTERRUPTIBLE POWER SUPPLY USING THE SAME

[75] Inventors: Ikuo Yamato; Norikazu Tokunaga, both of Hitachi, Japan

[73] Assignee: Hitachi, Ltd., Tokyo, Japan

[21] Appl. No.: 797,924

[22] Filed: Nov. 26, 1991

[30] Foreign Application Priority Data

Nov. 28, 1990 [JP] Japan .................... 2-323159

[51] Int. Cl.[5] ............................. H02M 5/27
[52] U.S. Cl. ......................... 363/8; 363/41; 363/159
[58] Field of Search .............. 363/98, 41, 8, 159, 363/1, 2, 3, 9, 10, 148, 149, 157, 163, 164, 165

[56] References Cited

U.S. PATENT DOCUMENTS

| | | | |
|---|---|---|---|
| 4,855,887 | 8/1989 | Yamata et al. ................ | 368/8 |
| 5,159,539 | 10/1992 | Koyama ........................ | 363/8 |

FOREIGN PATENT DOCUMENTS 481456 of 0000 European Pat. Off. .

OTHER PUBLICATIONS

Conf. Record of the 1990 IEEE Industry Applications Society Annual Meeting, Oct. 7, 1990, pp. 1119–1124 Kawabata, "High Frequency Link DC/AC Converter with PWM Cycloconverter".

21 Annual IEEE Power Electronics Specialists Conf. Jun. 11, 1990, pp. 749–756, Yamato, "High Frequency Link DC/AC Converter for Ups with a New Voltage Clamper".

Primary Examiner—Steven L. Stephan
Assistant Examiner—B. Davidson
Attorney, Agent, or Firm—Antonelli, Terry Stout & Kraus

[57] ABSTRACT

A three-phase a.c. uninterruptible power supply includes a transformer providing isolation between an input and an output, a single-phase inverter, and a cycloconverter. The uninterruptible power supply operates to convert a d.c. voltage into a high-frequency a.c. voltage in the single-phase inverter, transmit the output voltage of the single-phase inverter in an isolated state, and convert the output of the transformer into a three-phase voltage having a lower frequency, such as 50 or 60 Hz, than the frequency of the output voltage of the single-phase inverter. This enables the transformer providing isolation to operate at a high frequency, thereby enabling the size of the transformer to be reduced.

15 Claims, 12 Drawing Sheets

POWER CONVERSION SYSTEM, METHOD FOR CONTROLLING THE SAME, AND UNINTERRUPTIBLE POWER SUPPLY USING THE SAME

BACKGROUND OF THE INVENTION

The present invention relates to a power conversion system for converting d.c. power into three-phase a.c. power, and more particularly to a power conversion system which needs isolation between the input and the output, a method for controlling the same, and an uninterruptible power supply using the same.

Conventionally, an uninterruptible power supply has been known as a power conversion system which needs isolation between the input and the output. For example, a power conversion system disclosed in JP-A-61-236371 has been arranged to temporarily convert direct current into a higher frequency than that required by a load by using an inverter, isolating the converted current in a transformer, and then converting it into a desired frequency, for the purpose of reducing the size and weight of the transformer.

The aforementioned power conversion system, however, provides only single-phase a.c. power. To obtain three-phase a.c. power, therefore, it is necessary to provide three such systems. That is to say, the power conversion system has a shortcoming that it becomes larger and heavier if three-phase a.c. power is required.

SUMMARY OF THE INVENTION

It is an object of the present invention to provide a power conversion system for converting d.c. power into three-phase a.c. power which includes a small and lightweight transformer isolating an input and an output, and a method for controlling the power conversion system.

In carrying out the object, the power conversion system includes a single-phase inverter for supplying an a.c. voltage having a higher frequency than a predetermined frequency, a single-phase transformer for transmitting an output voltage of the inverter in the isolated state, a cycloconverter for converting the transmitted voltage into a three-phase a.c. voltage, and a control circuit for converting a single-phase high-frequency a.c. voltage output from the inverter into a three-phase a.c. voltage having a predetermined frequency as controlling on or off of a switching element of the cycloconverter in response to a PWM signal generated as being interlocked with the operation of the inverter.

The power conversion system according to the present invention operates to generate the PWM signal reversed at each one period of a carrier as being interlocked with the operation of the inverter and drive the cycloconverter in response to the PWM signal. Hence, like the conversion from a d.c. voltage into a three-phase PWM voltage in an inverter, the power conversion system is capable of converting a single-phase high-frequency a.c. voltage generated by the single-phase inverter into a three-phase low-frequency a.c. voltage, resulting in obtaining a three-phase a.c. voltage having a predetermined frequency. The power conversion system composed of the single-phase inverter, the single-phase transformer, and the three-phase cycloconverter makes it possible to remarkably reduce in size and weight a three-phase output power conversion system in which the transformer needs insulation.

DESCRIPTION OF THE PREFERRED EMBODIMENTS

Figure 1:
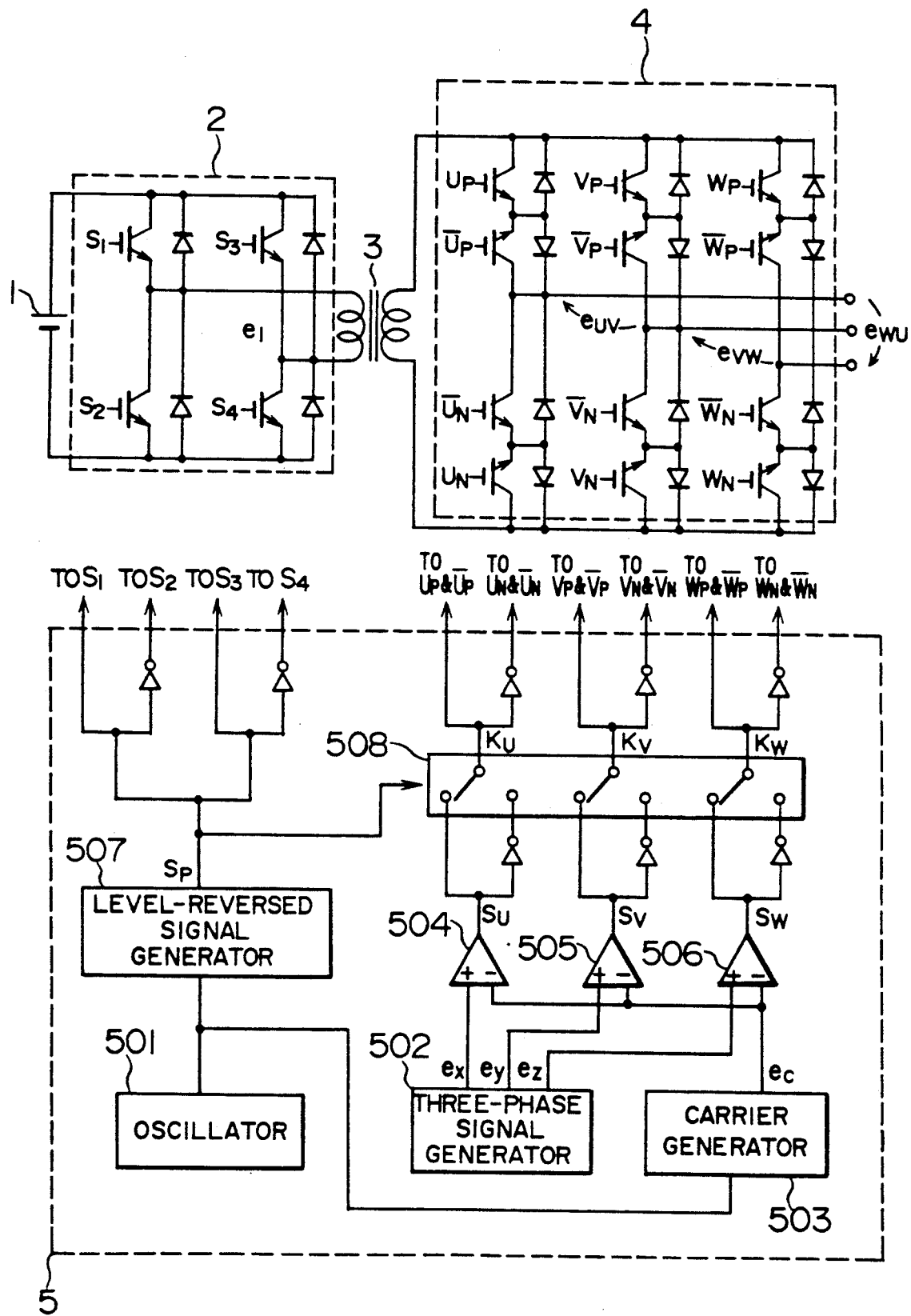
FIG. 1 is a circuit diagram showing a power conversion system according to an embodiment of the present invention.

Herein, an embodiment of the present invention will be described referring to FIG. 1 and FIGS. 2A-2L. In FIG. 1, 1 is a d.c. power source, 2 is a single-phase inverter, 3 is a single-phase transformer, 4 is a three-phase cycloconverter, and 5 is a control circuit. The control circuit 5 includes an oscillator 501, a level-reversed signal generator 507, a three-phase signal generator 502, a carrier generator 503, comparators 504 to 506, and a selection switch 508.

Figure 2:
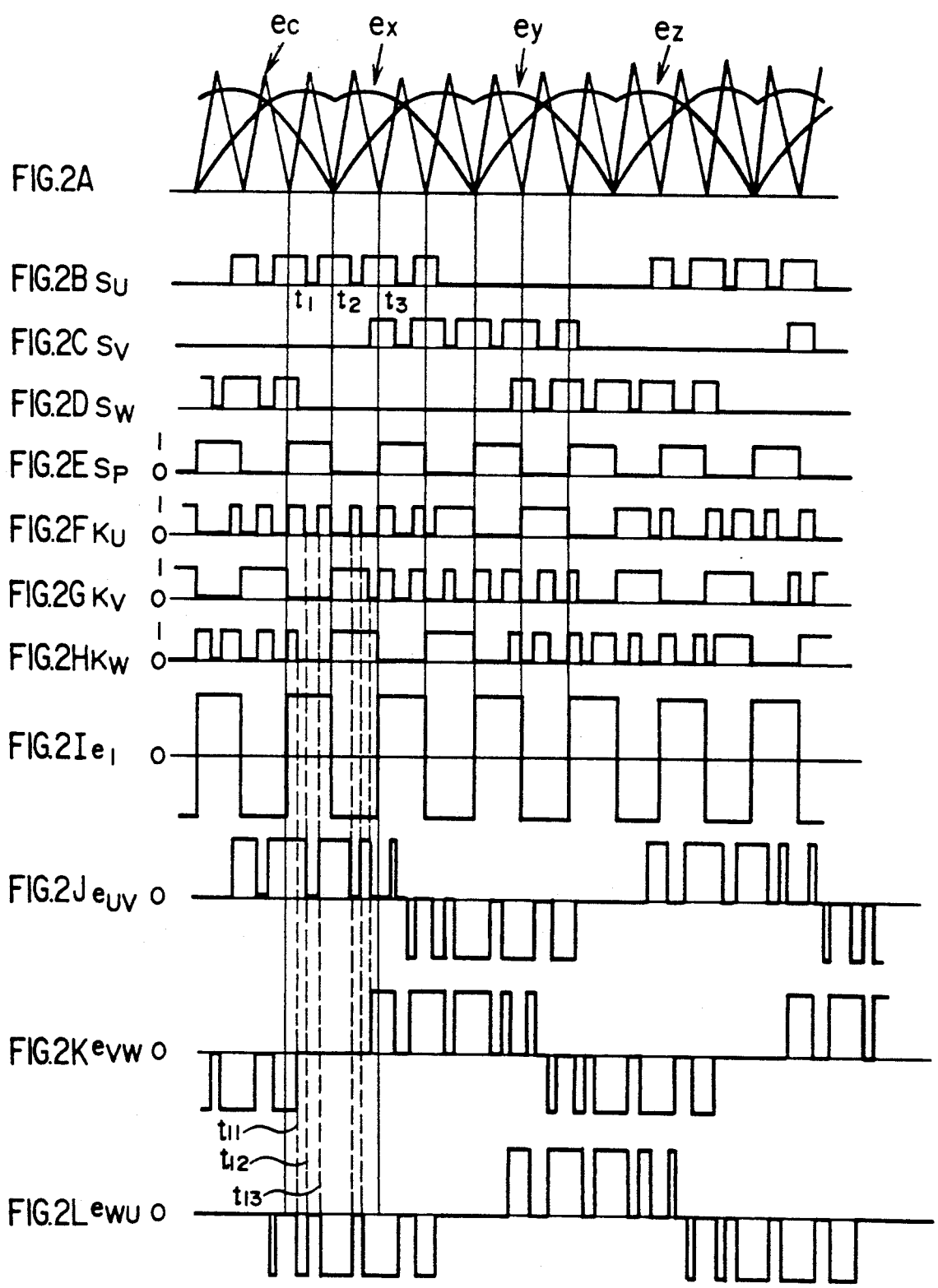
FIGS. 2A-2L are waveform diagrams for explaining the operation of the power conversion system shown in FIG. 1.

The single-phase inverter 2 has switching elements $S_1$ to $S_4$, the pair of $S_1$ and $S_4$ being turned off with the pair of $S_2$ and $S_3$ being turned on or vice versa in response to a level-reversed signal Sp supplied from the level-reversed signal generator 507. The level-reversed signal Sp is shown in FIG. 2E. The on or off control of the switching elements results in generating a square wave voltage $e_1$ shown in FIG. 2I. The comparators 504 to 506 serve to generate PWM signals Su, Sv, Sw from three-phase signals ex, ey, ez and a carrier ec as shown in FIG. 2A, respectively. The PWM signals Su, Sv, Sw shown in FIGS. 2B to 2D are the same as the conventional signals. The selection switch 508 serves to selectively output the PWM signals Su, Sv, Sw applied from the comparators 504 to 506 and their polarity-reversed signals, respectively. For example, since the signal Sp is at 1 level (hereinafter the term "level" will be omitted) during the period $t_1$ to $t_2$, the signals shown in FIGS. 2F to 2H having the same polarity as those signals Su, Sv, Sw are respectively applied to the output contacts Ku, Kv, Kw of the selection switch 508. Since the signal Sp is at 0 during the period $t_2$ to $t_3$, the signals having the polarities reversed to the signals Su, Sv, Sw are applied to the output contacts Ku, Kv, Kw of the selection switch 508.

Since during the period $t_1$ to $t_{11}$ the signal Kv is at 1, Ku is at 0, and Kw is at 1, the switching elements Up, $\overline{Up}$, Vn, $\overline{VN}$, Wp, $\overline{Wp}$ of the cycloconverter 4 are selectively made conductive. The output voltage $e_1$ shown in FIGS. 2J to 2L appears at the output of the cycloconverter 4 in a manner that the voltage $e_1$ is positive between the phases u and v and is negative between the phases v and w. Next, since during the period $t_{11}$ to $t_{12}$ the signal Ku is at 1, Kv is at 0, and Kw is at 0, the switching elements Up, $\overline{Up}$, Vn, $\overline{Vn}$, Wn, $\overline{Wn}$ of the cycloconverter 4 are selectively made conductive. During this period, the output voltage $e_1$ of the inverter appears at the output of the cycloconverter 4 in a manner that the output voltage $e_1$ is positive between the phases u and v and is negative between the phases w and u. Since during the period $t_{12}$ to $t_{13}$ all the signals Ku, Kv, Kw are at 0, the switching elements Un, $\overline{Un}$, Vn, $\overline{Vn}$, Wn, $\overline{Wn}$ of the cycloconverter 4 are selectively made conductive. Hence, the output voltages of the cycloconverter 4 are all made zero. Since during the period $t_{13}$ to $t_2$ the signal Ku is at 1, Kv is at 0, and Kw is at 0, the switching elements Up, $\overline{Up}$, Vn, $\overline{Vn}$, Wn, $\overline{Wn}$ of the cycloconverter 4 are selectively made conductive. During this period, the output voltage $e_1$ of the inverter appears at the output of the inverter 4 in a manner that the voltage $e_1$ is positive between the phases u and v and the voltage $e_1$ is negative between the phases w and u. Next, during the period $t_2$ to $t_3$, the signals Ku, Kv, Kw have different levels from those signals during the period $t_1$ to $t_2$. Since, however, the output voltage $e_1$ of the inverter is negative, like the period $t_1$ to $t_2$, at the output of the cycloconverter 4, the voltages shown in FIGS. 2J to 2L are generated between the respective phases. As is apparent from the above description, the PWM signals Ku, Kv, Kw are allowed to be changed to the signals corresponding to the change of the levels of the output voltages. Like the conventional three-phase PWM inverter for converting a d.c. voltage into a three-phase a.c. voltage, the cycloconverter 4 is capable of converting a high-frequency a.c. voltage into three-phase a.c. voltages euv, euw, ewu. Further, the transformer providing isolation in the present invention can be made smaller and more lightweight than the conventional three-phase PWM inverter.

Figure 3:
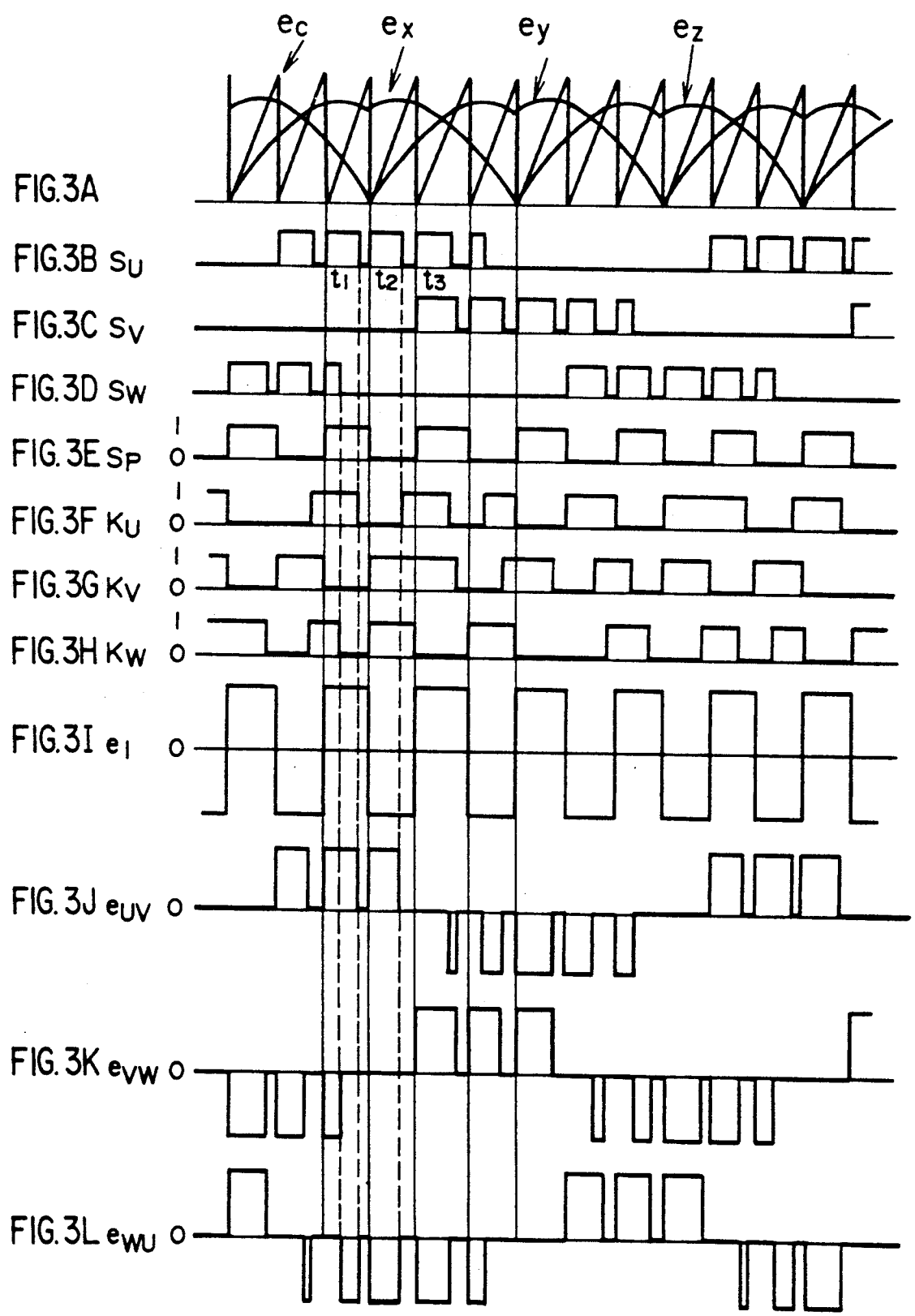
FIGS. 3A-3L are waveform diagrams for explaining the operation of the power conversion system shown in FIG. 1.

FIGS. 3A-3L show operations of the power conversion system according to another embodiment of the present invention. The power conversion system according to this embodiment employs a sawtooth carrier ec generated in the carrier generator 503 unlike the embodiment shown in FIGS. 1 and 2A-2L. Hence, the changing points of the signals Su, Sv, Sw are synchronized with the changing points $t_1$, $t_2$, $t_3$ of the level-reversed signal Sp. This results in reducing the time of reversing operations of Ku, Kv, Kw, that is, the switching frequency of the cycloconverter 4 as shown in FIGS. 3F to 3H. Hence, this embodiment can provide a power conversion system having a smaller power loss than the foregoing embodiment.

Figure 4:
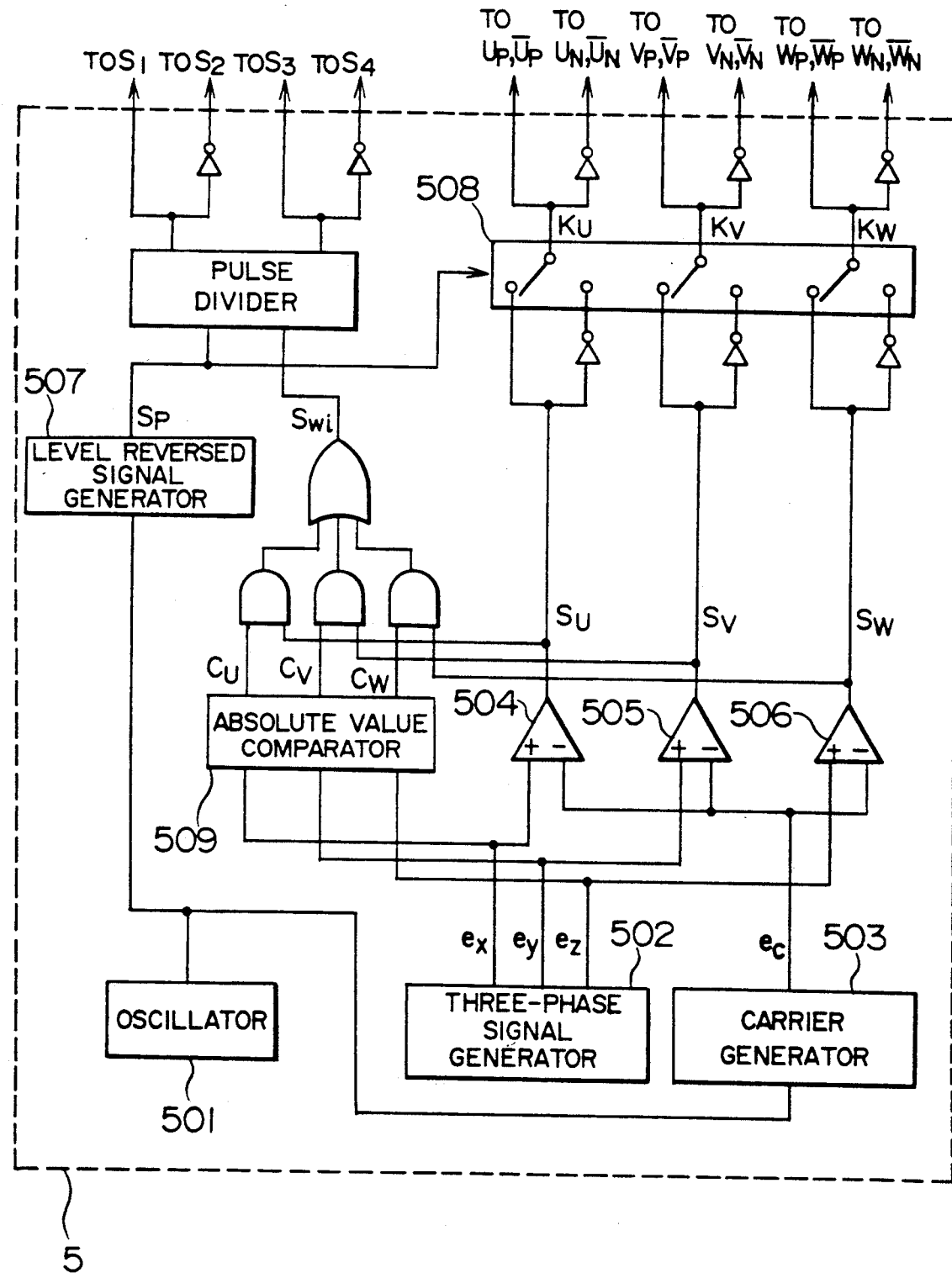
FIG. 4 is a block diagram showing a power conversion system according to another embodiment of the present invention.
Figure 5:
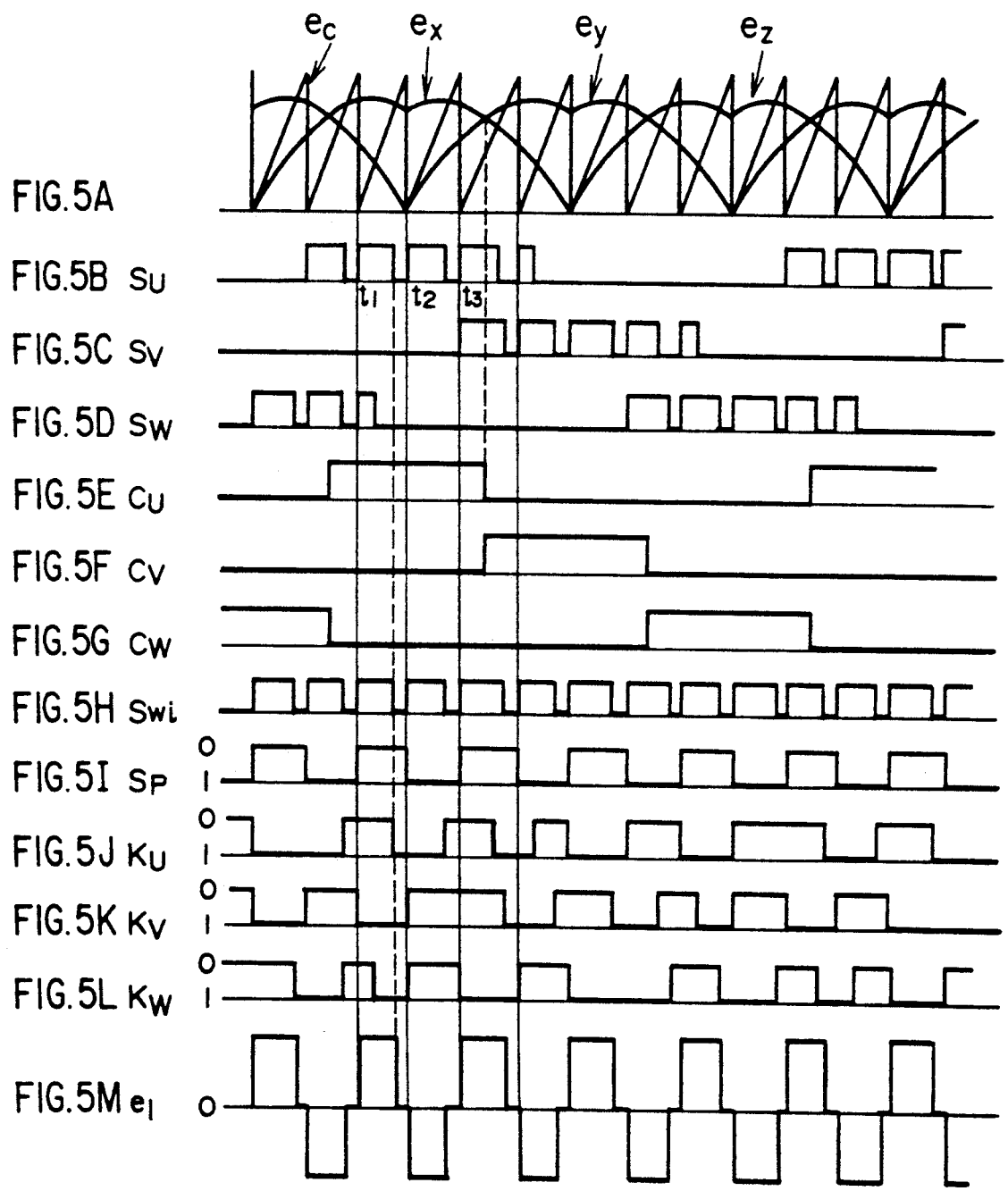
FIGS. 5A-5M are waveform diagrams for explaining the operation of the power conversion system shown in FIG. 4.
Figure 6:
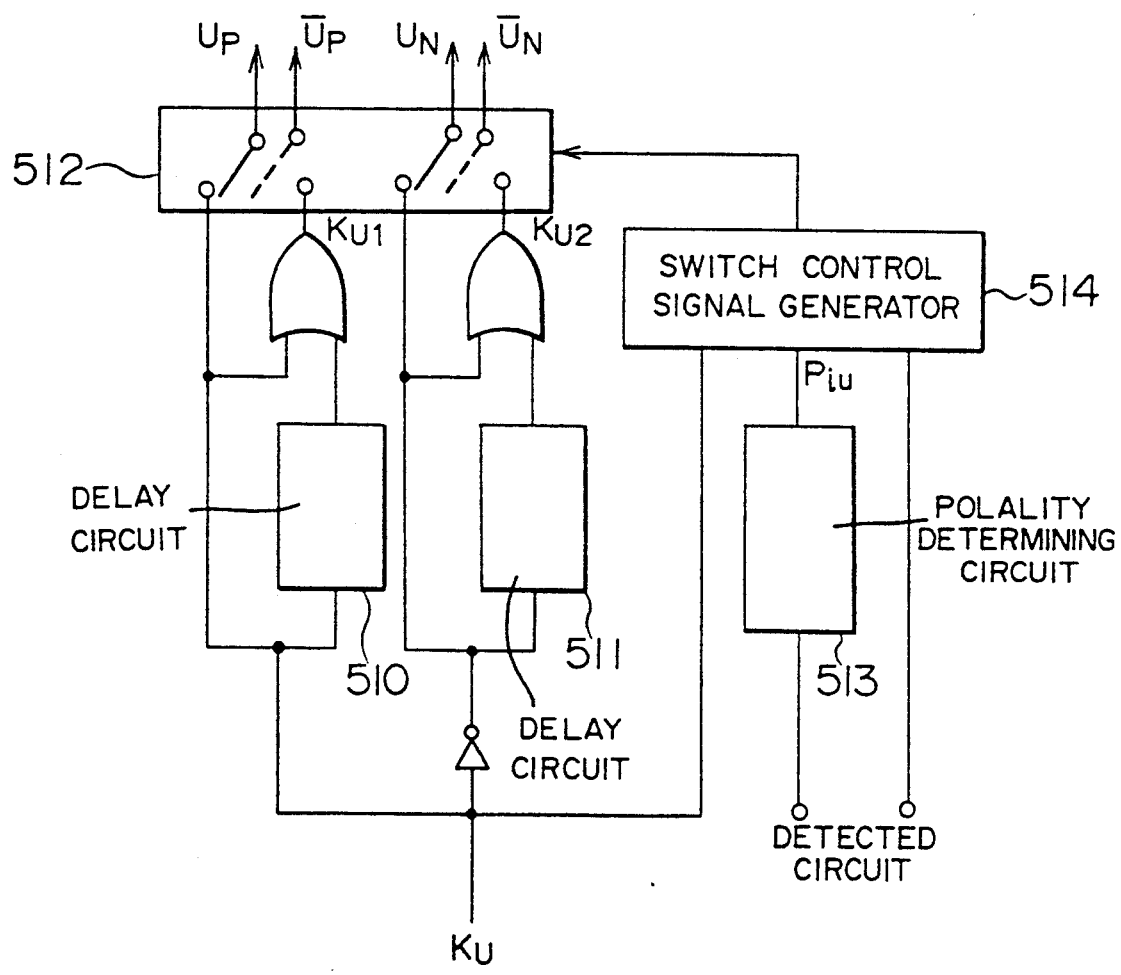
FIG. 6 is a block diagram showing a power conversion system according to another embodiment of the present invention.

Another embodiment of the present invention will be described referring to FIGS. 4 and 5A-5M. This embodiment provides means for generating a width signal Swi of an inverter output voltage in the control circuit 5 included in the embodiment shown in FIG. 1. As shown in FIG. 4, an absolute value comparator 509 serves to compare three-phase signals ex, ey, ez for generating signals Cu, Cv, Cw having larger periods than the other signals as shown in FIGS. 5E to 5G. The signals Cu, Cv, Cw and Su, Sv, Sw are supplied to a logic circuit. The logic circuit produces from those signals a width signal Swi of an inverter output voltage as shown in FIG. 5H. Depending on the signal Swi and the level-reversed signal Sp, the inverter 2 is driven. Further, there is provided a period when the output voltage of the inverter is zero as shown in FIG. 5M. According to this embodiment, then, the cycloconverter may perform the switching operation during the period when the output voltage of the inverter is 0. This results in reducing the loss of energy resulting from the switching operation, thereby substantially reducing the loss of the cycloconverter.

Another embodiment of the present invention will be described referring to FIG. 6 and FIGS. 7A-7I. According to this embodiment, the cycloconverter 4 makes use of an output voltage of the inverter 2 for performing the switching operation. That is to say, this embodiment is a result of replacing the section included in the embodiment shown in FIG. 1 for producing firing signals Up to Wn for the switching elements of the cycloconverter from the signals Ku, Kv, Kw of the output contacts of the selection switch 508 with another section shown in FIG. 6. The illustration in FIG. 6 and FIGS. 7A-7I concerns the phase U for which the firing signals Up and Un are formed from a signal Ku. For the other phases, the arrangement and the operation are the same as those for the phase U. 510 and 511 are delay circuits for delaying a signal Ku, 512 is a selection switch for selectively outputting the signal Ku and its reversed signal and a signal $Ku_1$ or $Ku_2$ sent from the delay circuits, 513 denotes a polarity determining circuit for determining a polarity of an output current, 514 denotes a selection switch control signal generator which serves to produce a control signal from the signal Ku, an output Piu of the polarity determining circuit 513, and the signal Sw.

Figure 7:
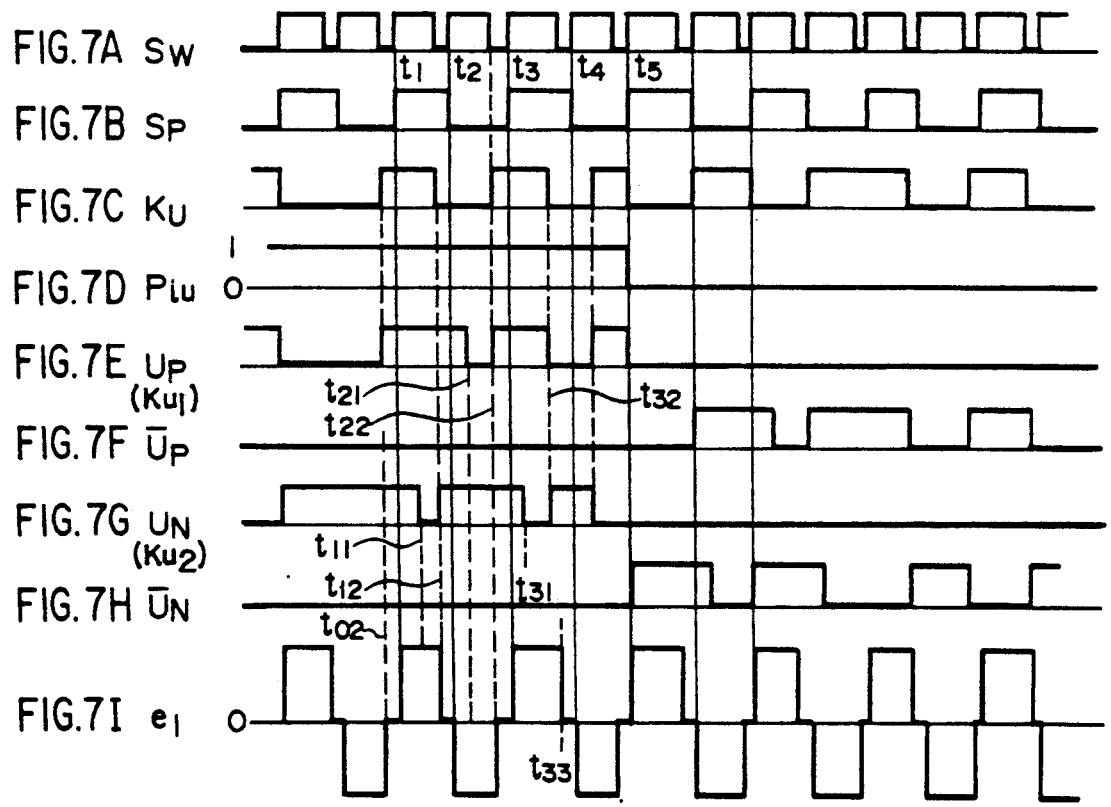
FIGS. 7A-7I are waveform diagrams for explaining the operation of the power conversion system shown in FIG. 6.

The operation of this embodiment will be described referring to FIGS. 7A-7I. The delay circuit and the OR circuit serve to produce from the signal Ku of FIG. 7C a signal $Ku_1$ shown in FIG. 7E, that is, from a signal having a value of 1 during the period $t_{02}$ to $t_{12}$ a signal having a value of 1 during the period $t_{02}$ to $t_{21}$ and from the signal Ku of FIG. 7C a signal $Ku_2$ shown in FIG. 7G, that is, from a signal having a value of 0 during the period $t_{12}$ to $t_{22}$ a signal having a value of 1 during the period $t_{12}$ to $t_{31}$. Herein, the output voltage and the output current are positive, and when the signal Ku is reversed to zero is equal to when the signal is reversed to zero. The output signal Piu of the polarity determining circuit 513 has a value of 1 as shown in FIG. 7D. The selection switch 512 performs the selective operation for converting the signals $Ku_1$ and $Ku_2$ into the firing signals Up and Un. For example, the firing signals are applied to both of Up and Un during the period of $t_{12}$ to $t_{21}$ If, therefore, at a time point $t_2$, the negative voltage $e_1$ from the inverter is applied from the switching elements Un to Up, the switching element Un is operated on and Up is operated off through the effect of the commutation resulting from the negative voltage. If $t_{32} < t_{33}$, that is, the time point when the signal Ku becomes zero is smaller than the time point when the signal Sw becomes zero, the selection switch 512 performs the selective operation for changing the signal Ku and its reversed signal into the firing signals Up and Un as shown in $t_{32}$ to $t_5$. At this time, the switching of the selection switch 512 matches to the switching of the element itself. If the output voltage and the output current are more negative than those at the time point $t_5$, the selection switch 512 performs the selective operation for changing the signals $Ku_1$ and $Ku_2$ into the firing signals Up and Un as shown in FIGS. 7A-7I. Like the foregoing case, the switching operation of the switching elements included in the cycloconverter is carried out through the commutation resulting from the output voltage of the inverter. According to this embodiment, the switching elements included in the cycloconverter are allowed to be switched not only by the switching operation method but also through the effect of the output voltage of the inverter. The switching done by the latter case results in reducing the loss of the cycloconverter. If an absolute value of the current magnitude is equal to or less than a predetermined value, the switching operation method is employed for operating the switching elements, so that the cycloconverter can operate more stably.

Another embodiment of the present invention will be described as referring to FIG. 9 and FIGS. 10A-10J. According to the present embodiment, like the embodiment shown in FIG. 6, the output voltage of the inverter 2 is used for switching the switching elements of the cycloconverter 4. Specifically, the section for producing the firing signals Up to Wn for the switching elements of the cycloconverter from the signals Ku, Kv, Kw applied to the output point of the selection switch 508 and the section for applying the signal from the output contact of the logic circuit into one input terminal of the pulse divider of the inverter, which are both included in the embodiment shown in FIG. 4, are replaced with the sections shown in FIG. 9. The illustration of FIGS. 9 and 10A-10J concern only the phase U for which the firing signals Up and Un are produced from the signal Ku. For the other phases, the arrangement and the operation are the same as those for the phase U. 515 denotes a pulse expander for expanding a pulse width of the pulse width signal Swi.

Figure 9:
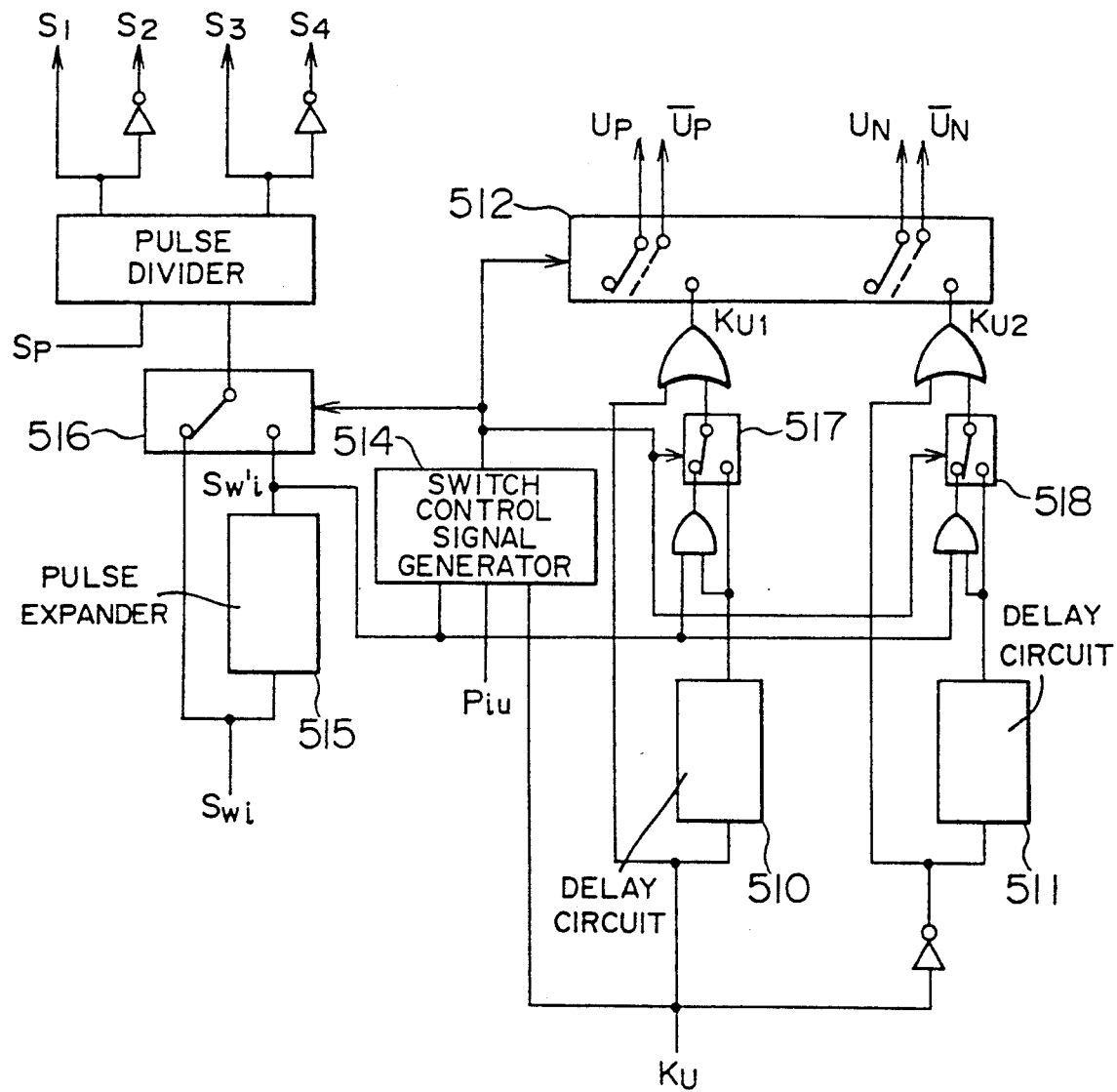
FIG. 9 is a block diagram showing a power conversion system according to another embodiment of the present invention.
Figure 10:
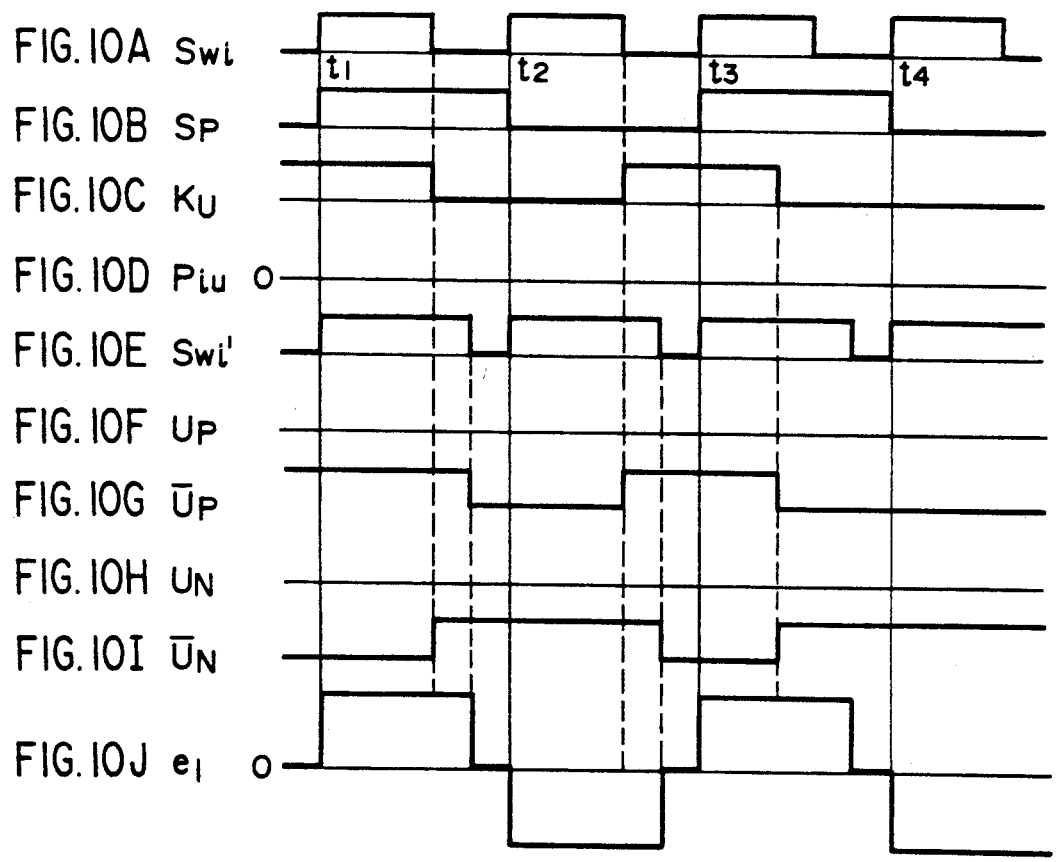
FIGS. 10A-10J are waveform diagrams for explaining the operation of the power conversion system shown in FIG. 9.

The operation of the embodiment shown in FIG. 9 will be described referring to FIGS. 10A-10J. FIGS. 10A-10J are expanded views of the period $t_1$ to $t_4$ shown in FIGS. 7A-7I and it is assumed that the signal Piu is at 0. Since the output voltage is positive and the output current is negative, the switch 512 selects the Ku side. At this time, the operation of the switches 512 is done by the switching operation of itself. The present embodiment adds the pulse expander 515 for expanding the pulse width signal Swi of the inverter and AND circuits for taking an AND product of the output of the delay circuit 510 and the output Swi' of the pulse expander 515 to the embodiment shown in FIG. 4. Further, the switch 516 for switching the signal Swi or Swi' and the switches 517 and 518 for switching the output of each delay circuit or the output of each AND circuit are further added thereto. In an area where an output voltage and an output current are different, the switch 516 is selected to the Swi' side, the switches 517, 518 are selected to the output sides of the AND circuits, respectively, and the switch 512 is selected to the Ku1 and the Ku2 sides. This results in supplying to the switching elements Up and Un off signals at the leading edge of the signal Swi'. During the period between $t_{11}$ and $t_{12}$, the switching elements Up and Un are both operated on. During this period, the effect of the signal Swi' results in generating a voltage at the output of the inverter, thereby being able to use the generated voltage for doing the switching operation. In the area where the output voltage and the output current are different, the switch 516 is selected to the Swi side and the switches 517, 518 are selected to the output side of the delay circuit, so that the present embodiment can operate in a manner quite similar to the foregoing embodiment. Hence, even in the area where the output voltage and the output current are different, the present embodiment is capable of operating the switches through the effect of the voltage, resulting in reducing the loss resulting from the switching operation of the cycloconverter.

In the above description shown in FIGS. 2A-2L, FIGS. 3A-3L and FIGS. 5A-5M, the three-phase signals ex, ey, ez have not been sinusoidal. It will be easily recognized by those skilled in the art that those signals may be sinusoidal and the foregoing operation of the power conversion system is true to those sinusoidal signals.

Figure 8:
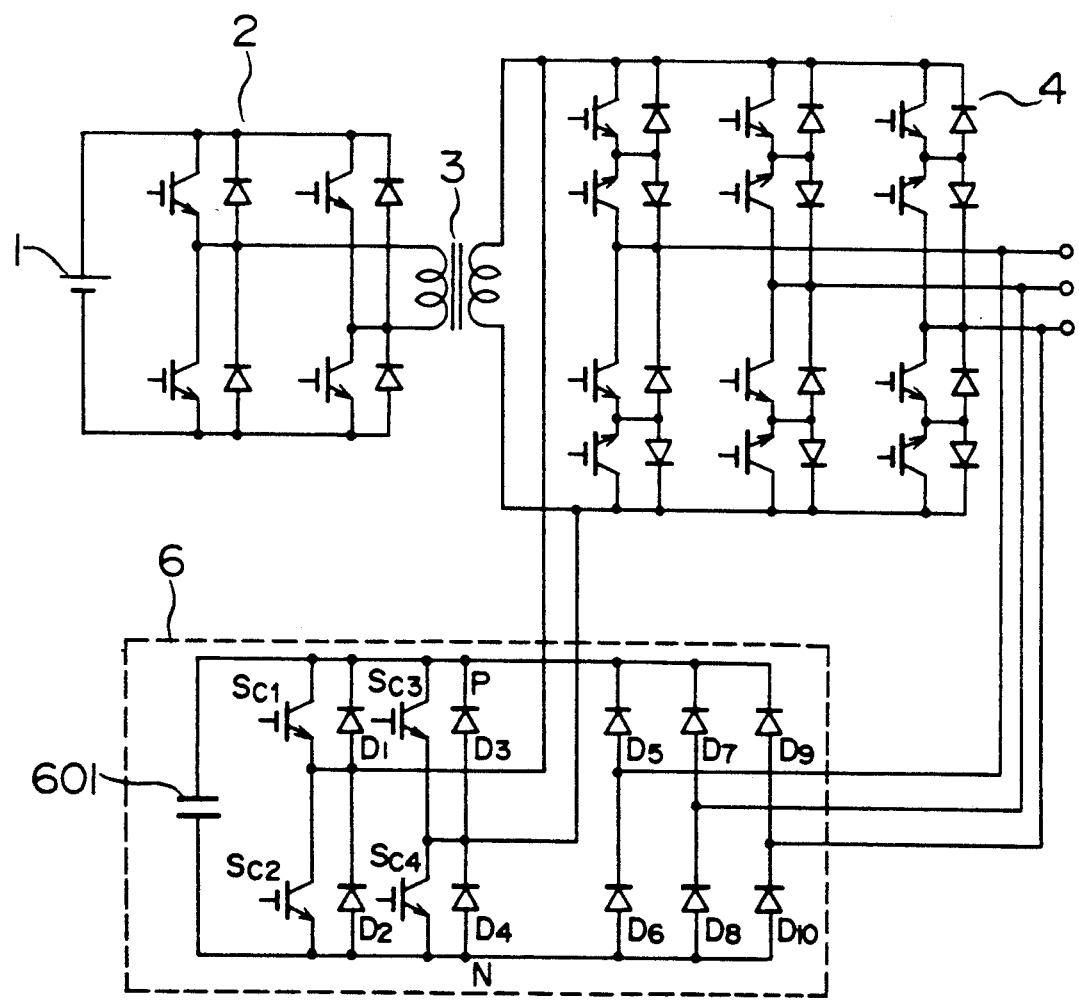
FIG. 8 is a block diagram showing a power conversion system according to another embodiment of the present invention.

Another embodiment of the present invention will be described referring to FIG. 8. The present embodiment adds to the embodiment shown in FIG. 1 an energy processing unit 6 for processing energy produced when the switching elements of the cycloconverter are operated. In FIG. 8, a control circuit is removed for driving each of those switching elements. The energy processing unit 6 includes a diode-bridge circuit composed of diodes $D_1$ to $D_{10}$. The diode-bridge circuit is connected between an input contact and an outputs of the cycloconverter 4. A capacitor 601 is connected between the outputs P and N of the diode-bridge circuit. Further, switching elements $Sc_1$ to $Sc_4$ are connected in opposite polarity in parallel to the diodes $D_1$ to $D_4$. When operating the switching elements of the cycloconverter, the energy such as inductance of the transformer 3 and the wire is absorbed by a capacitor 601 through the diodes $D_1$ to $D_{10}$. The switching elements Sc1 and Sc4 are operated in response to a level-reversed signal Sp and the switching elements Sc2 and Sc3 are operated in response to a reversed signal of Sp. It goes without saying that the driving period of the switching elements are narrower in width than the level-reversed signal Sp, because the switching elements are operated while the transformer 3 maintains the voltage $e_1$. The operation of the switching elements results in connecting the capacitor 601 to the secondary side of the transformer so that the capacitor 601 charges the voltage in the same polarity as the output voltage of the inverter. When operating the switching elements of the cycloconverter, therefore, the energy absorbed by the capacitor is allowed to be recovered on the inverter side or the output side of this energy processing unit 6. According to the present embodiment, the energy processing unit 6 is capable of processing the energy produced when operating the switching elements of the cycloconverter 4 without suffering from high loss, resulting in reducing the loss of the cycloconverter.

Figure 11:
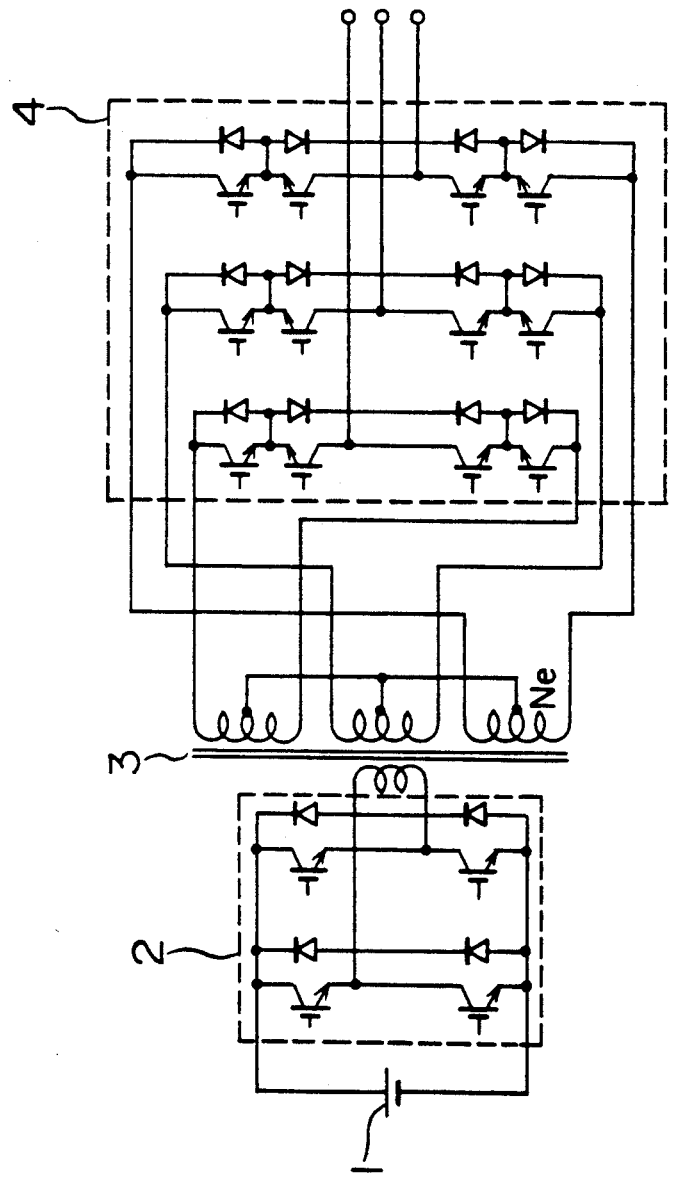
FIG. 11 is a block diagram showing a power conversion system according to another embodiment of the present invention.

Another embodiment of the present invention will be describe referring to FIG. 11. The present embodiment is an implementation of dividing the secondary side of the transformer 3 and the arrangement of the cycloconverter 4 included in the embodiment shown in FIG. 1 in a manner to match to respective phases. The operation of each switching element is the same as that of each of the foregoing embodiments. In addition to the advantages of the foregoing embodiments, the present embodiment also has an advantage that it can be easily arranged for both three-phase and four-wire type power conversion systems. In addition, it will be easily understood by those skilled in the art that the same energy processing unit as the unit shown in FIG. 8 may be provided.

Figure 12:
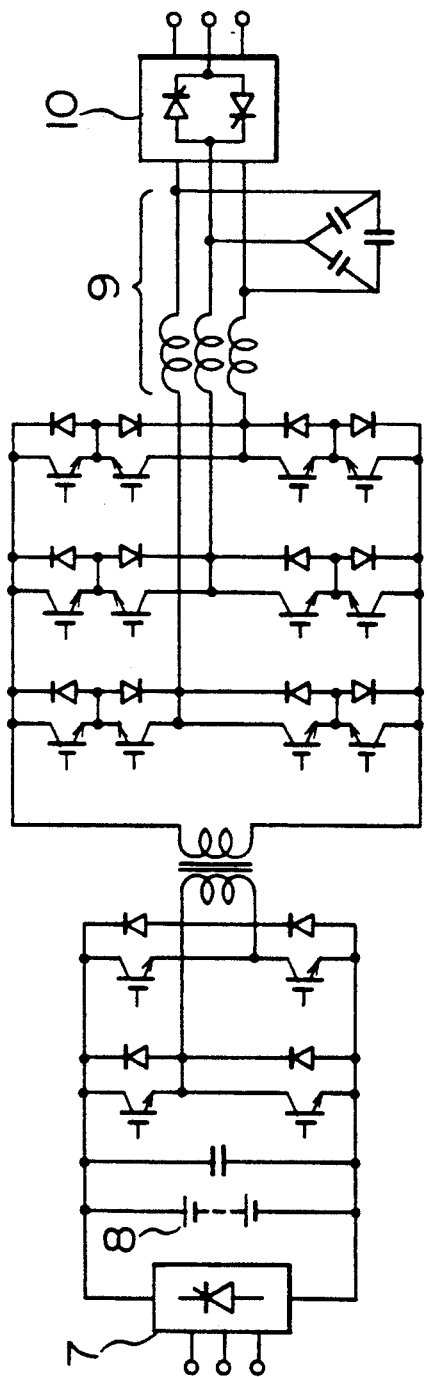
FIG. 12 is a block diagram showing an uninterruptible power supply according to an embodiment of the present invention.

Another embodiment of the present invention will be described as referring to FIG. 12. The present embodiment relates to an uninterruptible power supply arranged to have a power conversion system composed of an inverter 2, a transformer 3, and a cycloconverter 4 as shown in FIG. 1. The uninterruptible power supply of the present embodiment further includes a rectifier 7 for converting a three-phase a.c. voltage received from a commercial power source into a single-phase d.c. voltage and a cell 8 for supplying a voltage when the a.c. power source is interrupted, both of which are provided at the input side of a single-phase inverter, an output filter 9 for removing harmonic components contained in the output voltage of the cycloconverter and an a.c. switch 10 for separating a load from the power conversion system when an overcurrent is generated through the adverse effect of the load, both of which are provided at the output side of the cycloconverter. In FIG. 11, the description about the section for controlling the control circuit 5 and the like will be eliminated. The energy processing unit 6 shown in FIG. 8 may be connected to the arrangement of the present embodiment. The connection of the energy processing unit 6 results in being able to easily process the energy caused when switching the switching elements of the cycloconverter without suffering from high loss. The present embodiment is, therefore, capable of providing a low-loss and small uninterruptible power supply. Further, the power conversion section may be replaced with the power conversion system shown in FIG. 11. Besides, this uninterruptible power supply is allowed to easily correspond to the three-phase and the four-wire system. Specifically, the connection of the capacitors may be changed to a star connection and connected to a neutral point Ne of the transformer.

According to the present invention, the power conversion system arranged to have a single-phase inverter, a single-phase transformer and a three-phase cycloconverter is capable of supplying the same output as the conventional PWM inverter. It results in being able to remarkably reduce in size the three-phase power conversion system to be insulated.

What is claimed is:

1. A power conversion method comprising the steps of:
   (a) converting a d.c. voltage into a single-phase a.c. voltage having a first frequency with a single-phase inverter, the single-phase inverter including
      a plurality of switching elements connected in a bridge configuration, and
      a plurality of diodes, each of the diodes being connected in parallel with a respective one of the switching elements in an opposite polarity relationship therewith;
   (b) producing an isolated single-phase a.c. voltage isolated from the single-phase a.c. voltage from the single-phase inverter with a transformer, the isolated single-phase a.c. voltage having the first frequency;
   (c) converting the isolated single-phase a.c. voltage into a three-phase a.c. voltage having a second frequency lower than the first frequency with a three-phase cycloconverter, the three-phase cycloconverter including a plurality of switching elements;
   (e) generating a signal having a fixed frequency with an oscillator;
   (f) generating a level-reversed signal with a level-reversed signal generator based on the signal from the oscillator, the level-reversed signal having a level which alternately changes from "0" to "1" and from "1" and "0" at the frequency of the signal from the oscillator;
   (g) generating a carrier signal with a carrier signal generator based on the signal from the oscillator;
   (h) generating three-phase voltage command signals with a three-phase voltage command generator;
   (i) comparing the three-phase voltage command signals with the carrier signal with comparing means, and generating three-phase pulse-width modulation (PWM) signals based on results of the comparing;
   (j) selecting one of the three-phase PWM signals having a maximum pulse width among the three-phase PWM signals at any given time with first selecting means, and outputting the selected three-phase PWM signal as a width signal;
   (k) operating the switching elements of the single-phase inverter with inverter operating means based on the level-reversed signal and the width signal such that the single-phase a.c. voltage produced by the single-phase inverter is zero for a non-zero period of time;
   (l) reversing polarities of the three-phase PWM signals with polarity reversing means to generate polarity-reversed three-phase PWM signals;
   (m) selecting the three-phase PWM signals or the polarity-reversed there-phase PWM signals with second selecting means based at least on the level-reversed signal, and outputting the selected signals as output three-phase PWM signals; and
   (n) operating the switching elements of the three-phase cycloconverter with cycloconverter operating means based on the output three-phase PWM signals.

2. A power conversion system comprising:
   a single-phase inverter for receiving a d.c. voltage, and for converting the d.c. voltage into a single-phase a.c. voltage having a first frequency, the single-phase inverter including
      a plurality of switching elements connected in a bridge configuration, and
      a plurality of diodes, each of the diodes being connected in parallel with a respective one of the switching elements in an opposite polarity relationship therewith;
   a transformer for receiving the single-phase a.c. voltage from the single-phase inverter, and for outputting an isolated single-phase a.c. voltage isolated form the single-phase a.c. voltage from the single-phase inverter, the isolated single-phase a.c. voltage having the first frequency;
   a three-phase cycloconverter for receiving the isolated single-phase a.c. voltage, and for converting the isolated single-phase a.c. voltage into a three-phase a.c. voltage having a second frequency lower than the first frequency, the three-phase cycloconverter including a plurality of switching elements;

an oscillator for generating a signal having a fixed frequency;

a level-reversed signal generator for receiving the signal from the oscillator, and for generating a level-reversed signal based on the signal from the oscillator, the level-reversed signal having a level which alternately changes from "0" to "1" and from "1" and "0" at the frequency of the signal from the oscillator;

a carrier signal generator for receiving the signal from the oscillator, and for generating a carrier signal based on the signal from the oscillator;

a three-phase voltage command generator for generating three-phase voltage command signals;

comparing means for comparing the three-phase voltage command signals with the carrier signal, and for generating three-phase pulse-width modulation (PWM) signals based on results of the comparing;

first selecting means for receiving at least the thee-phase PWM signals, for selecting one of the three-phase PWM signals having a maximum pulse width among the three-phase PWM signals at any given time, and for outputting the selected three-phase PWM signal as a width signal;

inverter operating means for receiving the level-reversed signal and the width signal, and for operating the switching elements of the single-phase inverter based o the level-reversed signal and the width signal such that the single-phase a.c. voltage produced by the single-phase inverter is zero for a non-zero period of time;

polarity reversing means for receiving the three-phase PWM signals, and for reversing polarities of the three-phase PWM signals to generate polarity-reversed three-phase PWM signals;

second selecting means for receiving at least the level-reversed signal, the three-phase PWM signals, and the polarity-reversed three-phase PWM signals, for selecting the three-phase PWM signals or the polarity-reversed three-phase PWM signals based at least on the level-reversed signal, and for outputting the selected signals as output three-phase PWM signals; and cycloconverter operating means for receiving the output three-phase PWM signals, and for operating the switching elements of the three-phase cycloconverter based on the output three-phase PWM signals.

3. A power conversion system according to claim 2, wherein the first selecting means includes:

absolute value comparing means for receiving the three-phase voltage command signals, for comparing absolute values of the three-phase voltage command signals with each other, and for generating three-phase pulse signals each having a pulse width corresponding to a period in which the absolute value of a respective one of the three-phase voltage command signals is greater than the absolute values of the other ones of the three-phase voltage command signals;

AND means for receiving the three-phase PWM signals and the three-phase pulse signals, and for ANDing the three-phase PWM signals with respective ones of the three-phase pulse signals to generate AND output signals; and OR means for receiving the AND output signals from the AND means, and for ORing the AND output signals with each other to generate the width signal.

4. A power conversion system according to claim 3, further comprising an energy processing unit, the energy processing unit including:

a first rectifier circuit having an input connected across an input of the three-phase cycloconverter, the first rectifier circuit including a plurality of diodes connected in a bridge configuration;

a second rectifier circuit having an input connected across an output of the three-phase cycloconverter, the second rectifier circuit including a plurality of diodes connected in a bridge configuration, an output of the second rectifier circuit being connected in parallel with an output of the first rectifier circuit;

a capacitor connected in parallel with the output of the first rectifier circuit and the output of the second rectifier circuit;

a plurality of switching elements, each of the switching elements being connected in parallel with a respective one of the diodes of the first rectifier circuit in an opposite polarity relationship therewith; and means for operating the switching elements of the energy processing unit such that energy stored in the transformer is stored in the capacitor through the first rectifier circuit and the second rectifier circuit while the switching elements of the three-phase cycloconverter are being operated by the cycloconverter operating means.

5. A power conversion system as recited in claim 4, wherein the power conversion system is an uninterruptible power supply, and further comprises:

rectifying means for receiving an a.c. voltage from an a.c. power system, and for rectifying the a.c. voltage to produce a d.c. voltage;

energy storing means for receiving the d.c. voltage from the rectifying means, for storing energy derived from the d.c. voltage, and for outputting a d.c. voltage derived from the stored energy; and means for receiving the d.c. voltage from the rectifying means and the d.c. voltage from the energy storing means, for outputting the d.c. voltage from the rectifying means to the single-phase inverter when the a.c. power system is operating, and for outputting the d.c. voltage from the energy storing means to the single-phase inverter when the a.c. power system is not operating.

6. A power conversion system as recited in claim 3, wherein the power conversion system is an uninterruptible power supply, and further comprises:

rectifying means for receiving an a.c. voltage from an a.c. power system, and for rectifying the a.c. voltage to produce a d.c. voltage;

energy storing means for receiving the d.c. voltage from the rectifying means, for storing energy derived from the d.c. voltage, and for outputting a d.c. voltage derived from the stored energy; and means for receiving the d.c. voltage from the rectifying means and the d.c. voltage from the energy storing means, for outputting the d.c. voltage from the rectifying means to the single-phase inverter when the a.c. power system is operating, and for outputting the d.c. voltage from the energy storing means to the single-phase inverter when the a.c. power system is not operating.

7. A power conversion system according to claim 2, wherein the carrier signal is a sawtooth carrier signal.

8. A power conversion system as recited in claim 7, wherein the power conversion system is an uninterruptible power supply, and further comprises:
rectifying means for receiving an a.c. voltage from an a.c. power system, and for rectifying the a.c. voltage to produce a d.c. voltage;
energy storing means for receiving the d.c. voltage from the rectifying means, for storing energy derived from the d.c. voltage, and for outputting a d.c. voltage derived from the stored energy; and
means for receiving the d.c. voltage from the rectifying means and the d.c. voltage from the energy storing means, for outputting the d.c. voltage from the rectifying means to the single-phase inverter when the a.c. power system is operating, and for outputting the d.c. voltage from the energy storing means to the single-phase inverter when the a.c. power system is not operating.

9. A power conversion system according to claim 2, further comprising an energy processing unit, the energy processing unit including:
a first rectifier circuit having an input connected across an input of the three-phase cycloconverter, the first rectifier circuit including a plurality of diodes connected in a bridge configuration;
a second rectifier circuit having an input connected across an output of the three-phase cycloconverter, the second rectifier circuit including a plurality of diodes connected in a bridge configuration, an output of the second rectifier circuit being connected in parallel with an output of the first rectifier circuit;
a capacitor connected in parallel with the output of the first rectifier circuit and the output of the second rectifier circuit;
a plurality of switching elements, each of the switching elements being connected in parallel with a respective one of the diodes of the first rectifier circuit in an opposite polarity relationship therewith; and
means for operating the switching elements of the energy processing unit such that energy stored in the transformer is stored in the capacitor through the first rectifier circuit and the second rectifier circuit while the switching elements of the three-phase cycloconverter are being operated by the cycloconverter operating means.

10. A power conversion system as recited in claim 9, wherein the power conversion system is an uninterruptible power supply, and further comprises:
rectifying means for receiving an a.c. voltage from an a.c. power system, and for rectifying the a.c. voltage to produce a d.c. voltage;
energy storing means for receiving the d.c. voltage from the rectifying means, for storing energy derived from the d.c. voltage, and for outputting a d.c. voltage derived from the stored energy; and
means for receiving the d.c. voltage from the rectifying means and the d.c. voltage from the energy storing means, for outputting the d.c. voltage from the rectifying means to the single-phase inverter when the a.c. power system is operating, and for outputting the d.c. voltage from the energy storing means to the single-phase inverter when the a.c. power system is not operating.

11. A power conversion system according to claim 2, further comprising a polarity signal generator for detecting a polarity of an output current of the single-phase inverter, and for generating a polarity signal indicative of the detected polarity;
wherein the second selecting means also receives the polarity signal, and selects the three-phase PWM signals or the polarity-reversed three-phase PWM signals based on the level-reversed signal and the polarity signal.

12. A power conversion system as recited in claim 11, wherein the power conversion system is an uninterruptible power supply, and further comprises:
rectifying means for receiving an a.c. voltage from an a.c. power system, and for rectifying the a.c. voltage to produce a d.c. voltage;
energy storing means for receiving the d.c. voltage from the rectifying means, for storing energy derived from the d.c. voltage, and for outputting a d.c. voltage derived from the stored energy; and
means for receiving the d.c. voltage from the rectifying means and the d.c. voltage from the energy storing means, for outputting the d.c. voltage from the rectifying means to the single-phase inverter when the a.c. power system is operating, and for outputting the d.c. voltage from the energy storing means to the single-phase inverter when the a.c. power system is not operating.

13. A power conversion system according to claim 2, wherein the width signal is an inverter output voltage width signal specifying a width of the single-phase a.c. voltage produced by the single-phase inverter, the width being such that the single-phase a.c. voltage produced by the single-phase inverter is zero for a non-zero period of time.

14. A power conversion system as recited in claim 13, wherein the power conversion system is an uninterruptible power supply, and further comprises:
rectifying means for receiving an a.c. voltage from an a.c. power system, and for rectifying the a.c. voltage to produce a d.c. voltage;
energy storing means for receiving the d.c. voltage from the rectifying means, for storing energy derived from the d.c. voltage, and for outputting a d.c. voltage derived from the stored energy; and
means for receiving the d.c. voltage from the rectifying means and the d.c. voltage from the energy storing means, for outputting the d.c. voltage from the rectifying means to the single-phase inverter when the a.c. power system is operating, and for outputting the d.c. voltage from the energy storing means to the single-phase inverter when the a.c. power system is not operating.

15. A power conversion system as recited in claim 2, wherein the power conversion system is an uninterruptible power supply, and further comprises:
rectifying means for receiving an a.c. voltage from an a.c. power system, and for rectifying the a.c. voltage to produce a d.c. voltage;
energy storing means for receiving the d.c. voltage from the rectifying means, for storing energy derived from the d.c. voltage, and for outputting a d.c. voltage derived from the stored energy; and
means for receiving the d.c. voltage from the rectifying means and the d.c. voltage from the energy storing means, for outputting the d.c. voltage from the rectifying means to the single-phase inverter when the a.c. power system is operating, and for outputting the d.c. voltage form the energy storing means to the single-phase inverter when the a.c. power system is not operating.

* * * * *